May 8, 1951  E. B. PAGE ET AL  2,552,293
GUNRACK FOR AUTOMOBILES
Filed June 6, 1949  2 Sheets-Sheet 1
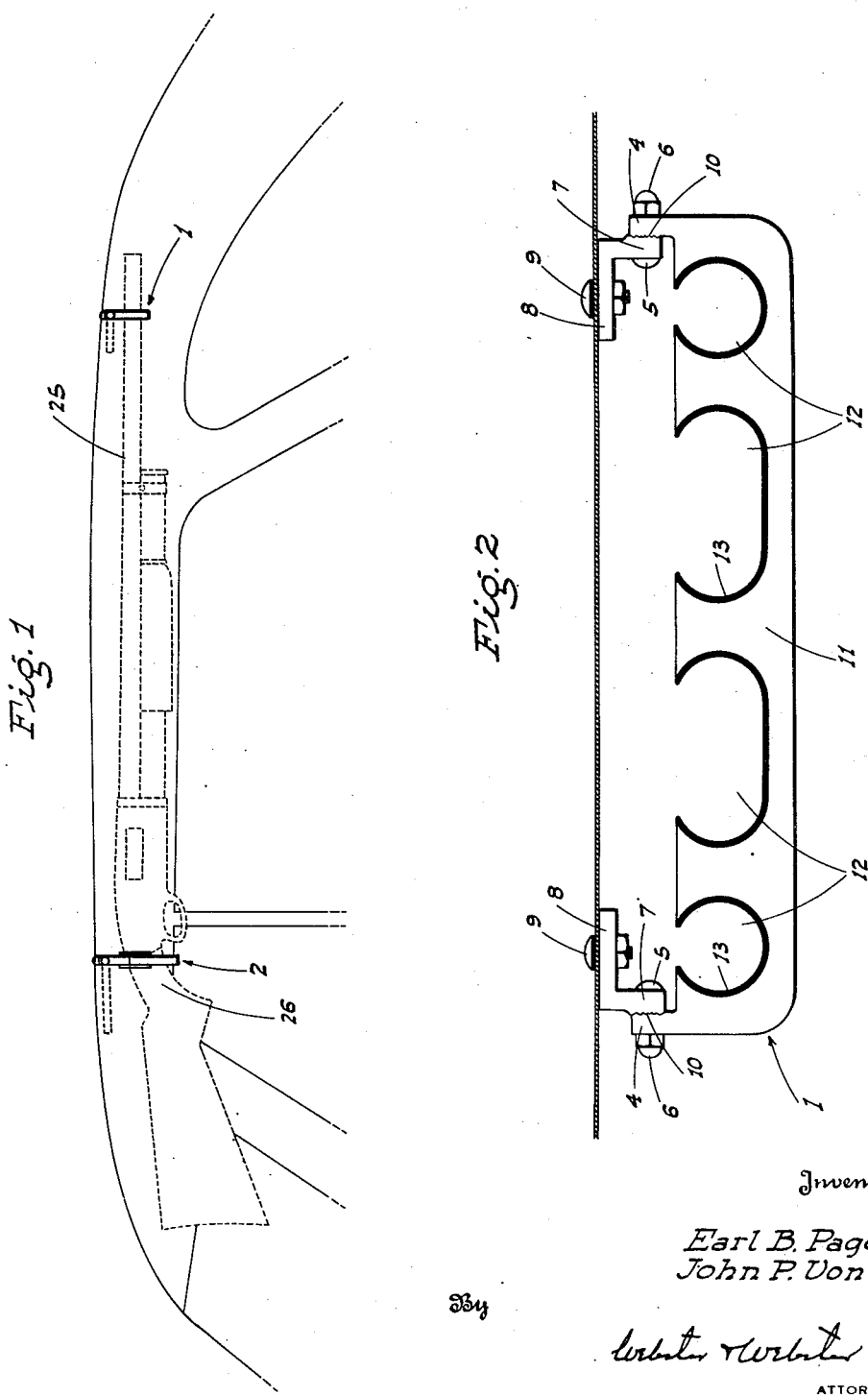
Inventors
Earl B. Page
John P. Vonich
ATTORNEYS May 8, 1951 E. B. PAGE ET AL 2,552,293
GUNRACK FOR AUTOMOBILES
Filed June 6, 1949 2 Sheets-Sheet 2
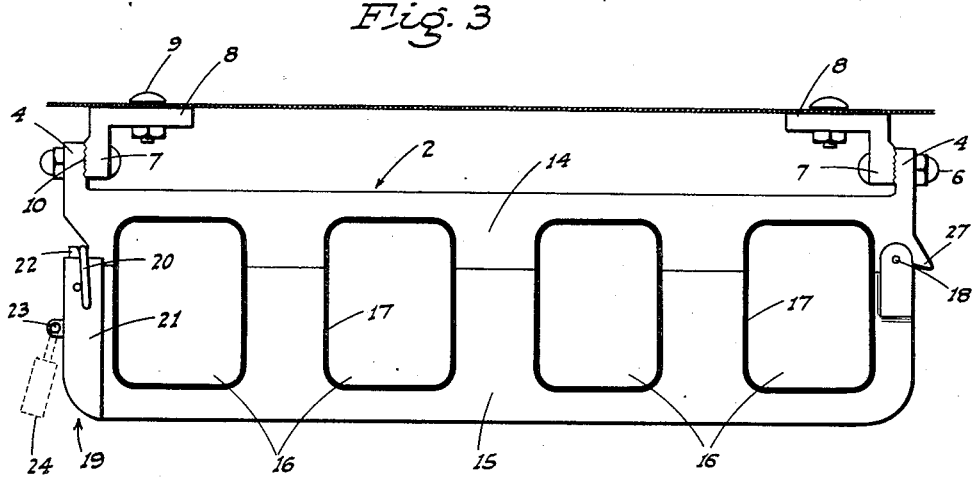
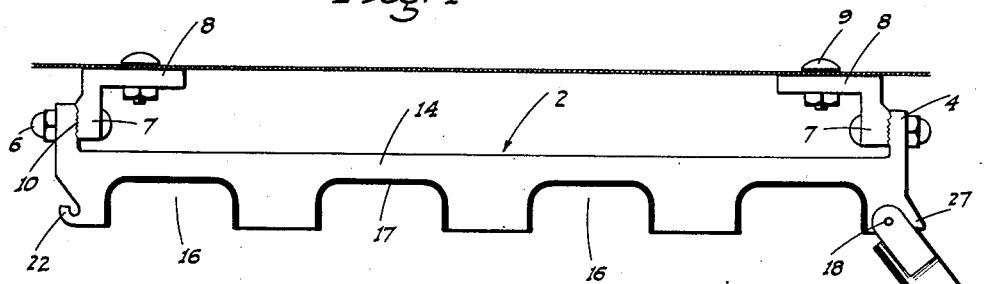
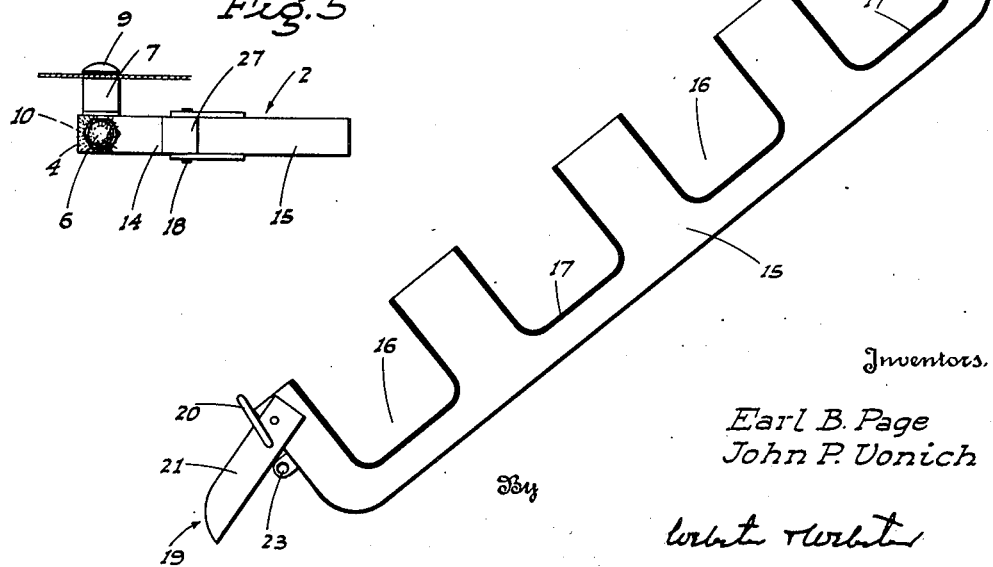
Inventors,
Earl B. Page
John P. Vonich
By
ATTORNEYS Patented May 8, 1951

2,552,293

UNITED STATES PATENT OFFICE 2,552,293

GUNRACK FOR AUTOMOBILES

Earl B. Page, Sacramento, and John P. Vonich, Emeryville, Calif.

Application June 6, 1949, Serial No. 97,332

2 Claims. (Cl. 224—42.1)

This invention is directed to, and it is an object to provide, a novel gun rack for automobiles; the rack being mounted in connection with the roof of the automobile within the latter whereby sportsmen's guns such as shotguns or rifles may be carried in a safe, convenient, and yet out-of-the-way position lengthwise of and adjacent said roof.

A separate object of the invention is to provide a gun rack, as above, which is arranged so that guns can be placed in or removed from the rack only from the right front door of the automobile; this tending to require a person to hold a gun in a safe position while manipulating such gun with respect to the rack.

Another object of the invention is to provide a gun rack designed to support guns in a manner to protect the same from mars or other damage when traveling, and additionally the supported guns are out of the weather and clear of dirt and dust on the floor or in the trunk of the automobile.

A further object of the invention is to provide a gun rack, for automobiles, which can be locked to prevent the theft or unauthorized removal of guns from said rack.

An additional object of the invention is to provide a gun rack, for automobiles, which comprises a pair of transverse rack units secured to and spaced lengthwise of the automobile roof; such rack units normally depending for gun reception but being foldable upwardly against the roof when not in use.

It is also an object of the invention to provide a gun rack, for automobiles, which is designed for ease and economy of manufacture.

A still further object of the invention is to provide a practical and reliable gun rack, for automobiles, and one which will be exceedingly effective for the purpose for which it is designed.

These objects are accomplished by means of such structure and relative arrangement of parts as will fully appear by a perusal of the following specification and claims.

In the drawings:

Fig. 1 is a fragmentary side outline of an automobile showing the gun rack as installed and in use.

Fig. 2 is a face elevation of the rear rack unit.

Fig. 3 is a face elevation of the front rack unit as closed for use.

Fig. 4 is a similar view, but shows the front rack unit open for removal or placement of guns in the rack.

Fig. 5 is a fragmentary end elevation showing the manner of folding of one of the rack units.

Referring now more particularly to the characters of reference on the drawings, the novel gun rack comprises a rear transverse rack unit 1 and a front transverse rack unit 2 adapted to be disposed in an automobile adjacent the roof 3 and spaced lengthwise thereof; such rack units 1 and 2 being secured to the roof 3 as will hereinafter appear.

Each of the rack units 1 and 2 is formed at opposite ends with an upstanding ear 4 attached by a bolt 5 and nut 6 to a depending bracket 7. Each bracket 7 includes a horizontal top flange 8 bolted to the roof 3 of the car, as at 9; the bolt 9 having a water-tight seal with said roof.

Each ear 4 and the corresponding depending bracket 7 have engaged serrated faces 10 normally in close holding engagement. These parts are normally set so that the rack units 1 and 2 depend in gun supporting position. However, when the rack units are not in use the nuts 6 are loosened and the rack units are folded upwardly to an out-of-the-way position generally parallel to the roof. See the dotted line position of the rack units 1 and 2, as in Fig. 1. When the rack units are swung to such folded position, the nuts 6 are retightened so as to reengage the matching serrated faces 10, which assures that said rack units cannot swing downward, accidentally, from their out-of-the-way position.

The rear rack unit 1 comprises a single cross bar 11, formed with a plurality of spaced barrel receiving cradles 12 having resilient lining 13 therein; the two outermost cradles 12 being formed for the reception of single-barrel guns, while the two intermediate cradles are elongated for the reception of double-barrel guns. The resilient lining 13 assures against marring or damage to the gun barrels.

The front rack unit 2 comprises an upper cross bar 14 and a lower cross bar 15; the upper cross bar 14 being the one which includes the ears 4 secured to the brackets 7.

The lower cross bar 15 is formed with a plurality of cradles 16 corresponding to the cradles 12, and each of the cradles 16 is provided with resilient lining 17 for gun protection. The cradles 16 are of substantial height and extend somewhat into the upper cross bar 14.

At one end of the lower cross bar 15 is hinged, as at 18, to the corresponding end of the upper cross bar 14, whereby said lower cross bar 15 may swing from a normal horizontal position in engagement with the upper cross bar 14, as in Fig. 3, to a downwardly inclined position clear of the latter, as in Fig. 4.

The lower cross bar 15 is normally maintained in its closed position, as in Fig. 3, by a releasable catch 19 of snap-action type which includes a loop 20 on a lever 21 carried by the lower cross bar 15; the loop 20 normally engaging with a hook 22 on the upper cross bar 14.

A padlock eye 23 normally projects through the lever 21 to receive a padlock 24. In this manner the gun rack can be locked against unauthorized removal of the guns.

When the gun rack is in use, as in Fig. 1, each gun is disposed lengthwise of the automobile in the same and closely adjacent the roof. Each such gun points rearwardly, with the barrel 25 engaged in one of the cradles 12, and with the grip portion 26 of the stock engaged in a corresponding one of the cradles 16. This effectively supports the gun at an elevated, out-of-the-way, and safe position in the automobile.

When it is desired to place a gun in, or remove it from, the rack, the lower cross bar 15 of the front rack unit 2 is released and lowered to its open position, as in Fig. 4; there being a hinge stop 27 which limits such opening motion of the lower cross bar 15 beyond a predetermined point.

With the lower cross bar 15 in open position a gun can be readily and conveniently placed in, or removed from, the rack; the operation being capable of accomplishment only from the right front door of the automobile, as the lower cross bar 15—when open—inclines in that direction. This is a safety feature, for the reason that it requires the person holding the gun to manipulate it in a proper and safe manner as such gun is being racked or unracked.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A gun rack for an automobile having a roof; said rack comprising first and second rack units spaced apart lengthwise of such roof, the first rack unit comprising a cross bar with means to secure said bar to and under the roof adjacent the same, the bar having an opening therethrough to freely receive and locate the barrel end of a gun; the second rack unit comprising upper and lower cross bars disposed in alined relation, means to secure the upper bar to and under the roof adjacent the same, a hinge connection between the upper and lower bars at one end thereof to enable the lower bar to be swung up and down relative to the upper bar, and a releasable catch device between the upper and lower bars at their other end arranged to maintain the bars in substantially parallel and adjacent relationship the adjacent longitudinal edges of such bars being cut away so that the cut-away areas together form a substantially rectangular opening, when the bars are in such adjacent relationship, of a size to snugly surround the grip portion of a gun whose barrel end is located in the opening of the bar of the first rack unit.

2. A structure as in claim 1, with stop means to limit downward swinging of the lower bar to a predetermined angular position; the greatest portion of the grip surrounding opening being in the lower bar whereby the grip will be firmly retained in said opening without lateral gravity displacement when the bar is in such angular position.

EARL B. PAGE.
JOHN P. VONICH.

REFERENCES CITED

The following references are of record in the file of this patent:

UNITED STATES PATENTS

| Number | Name | Date |
|---|---|---|
| 438,735 | Miller et al. | Oct. 21, 1890 |
| 1,860,925 | Cranshaw | May 31, 1932 |
| 1,889,350 | Cohen-Venezian | Nov. 29, 1932 |
| 1,914,259 | Irwin | June 13, 1933 |
| 2,119,217 | Rocchi | May 31, 1938 |
| 2,447,908 | Hoots | Aug. 24, 1948 |

FOREIGN PATENTS

| Number | Country | Date |
|---|---|---|
| 498,714 | Germany | May 26, 1930 |